United States Patent
Tomimatsu et al.

[11] Patent Number: 5,913,649
[45] Date of Patent: Jun. 22, 1999

[54] PROTECTOR CAP FOR USE IN AUTOMOTIVE VEHICLE

[75] Inventors: Kazunori Tomimatsu, Isehara; Kenichi Saito, Fujisawa; Tetsuo Maki; Masanobu Yoshioka, both of Yokosuka, all of Japan

[73] Assignee: Nissan Motor Co., Ltd, Yokohama, Japan

[21] Appl. No.: 08/932,831

[22] Filed: Sep. 18, 1997

Related U.S. Application Data

[63] Continuation of application No. 08/572,541, Dec. 14, 1995, abandoned.

[30] Foreign Application Priority Data

Dec. 27, 1994 [JP] Japan ................................ 6-326194

[51] Int. Cl.$^6$ ............................................ A47G 3/00
[52] U.S. Cl. ........................ 411/373; 411/371; 411/377; 411/372
[58] Field of Search ........................... 411/372, 373, 411/377, 429, 431, 371, 374

[56] References Cited

U.S. PATENT DOCUMENTS

| | | | |
|---|---|---|---|
| 915,068 | 3/1909 | Bowen | 411/372 |
| 1,805,937 | 5/1931 | Berge | 411/372 |
| 2,103,743 | 12/1937 | Doty | 411/373 |
| 2,627,778 | 2/1953 | Hodell | 411/373 |
| 2,819,642 | 1/1958 | Refrigeri | 411/373 |
| 3,147,824 | 9/1964 | Henderson | 411/431 |
| 4,576,533 | 3/1986 | Chartier | 411/373 |
| 4,659,273 | 4/1987 | Dudley | 411/373 |
| 4,701,089 | 10/1987 | Nettel | 411/373 |
| 4,784,555 | 11/1988 | Cantrell | 411/373 |
| 4,890,967 | 1/1990 | Rosenbaum | 411/372 |
| 4,944,644 | 7/1990 | Bell | 411/372 |
| 4,962,968 | 10/1990 | Caplin | 411/431 |
| 5,017,068 | 5/1991 | Cooksey | 411/373 |
| 5,103,538 | 4/1992 | Ryder | 411/372 |
| 5,480,273 | 1/1996 | Jou | 411/373 |

FOREIGN PATENT DOCUMENTS

| | | | |
|---|---|---|---|
| 608864 | 9/1960 | Italy | 411/373 |
| 1-89258 | 6/1989 | Japan . | |

*Primary Examiner*—Steven Meyers
*Assistant Examiner*—Teri Pham
*Attorney, Agent, or Firm*—Foley & Lardner

[57] ABSTRACT

A protector cap for covering a mounting bolt head has a spacer interposed between the cap and the bolt to position the cap with respect to the bolt head and to isolate the cap from the bolt head. The cap is made of a resin. The spacer is a separate member engaged with the inner surface of the cap.

6 Claims, 5 Drawing Sheets

PROTECTOR CAP FOR USE IN AUTOMOTIVE VEHICLE

This application is a continuation application serial no. 08/572,541, filed Dec. 14, 1995, now abandoned.

BACKGROUND OF THE INVENTION

The present invention relates generally to a protector cap for use in an automotive vehicle and more particularly, to a cap for a bolt for mounting an anchor of a seat belt.

A protector cap for use in an automotive vehicle is Disclosed, for example, in JP-U 1-89258 This protector cap can cover a head of a mounting bolt of metallic material which is engaged with a weld nut fixed on an underside of an adjuster plate as a vehicular body member, which is vertically movably supported with respect to a shoulder adjuster supported to a center pillar.

The mounting bolt serves to mount to the adjuster plate an anchor of a through ring of a seat belt.

The protector cap is formed in a shape to enclose, together with a part of the anchor, the head of the mounting bolt on the three sides thereof. The protector cap has a claw formed in an upper portion to be engaged with an opening of the adjuster plate, and a cross-shaped rib arranged to protrude from a back to abut on a flat portion of the head of the mounting bolt, preventing the protector cap from being dented.

As for the known protector cap for use in an automotive vehicle, however, if there is a great clearance between the back of the protector cap and the flat portion of the head of the mounting bolt, a protrusion amount of the rib arranged to protrude from the back of the protector cap becomes greater, so that. a depression or sinking can be produced on a surface of the protector cap due to a liquid resin flowing to the rib upon molding of the protector cap.

Moreover, when engaging the claw with the opening of the adjuster plate, a worker cannot see the claw since it is formed on the back of the protector cap, and depends on any guide, so that he can break off the claw by applying an excessive load thereto by striking, etc. Further, since there is no positioning with respect to the head of the mounting bolt when the rib arranged on the back of the protector cap abuts on the flat portion of the head of the mounting bolt, the protector cap may suffer an unsteadiness, and a positional displacement in the vertical and longitudinal directions, resulting in a degradation of the commercial value in view of the mounting rigidity.

It is, therefore, an object of the present invention to provide a protector cap for use in an automotive vehicle, which is free from a sinking on the surface of the protector cap and ensures a firm mounting of the protector cap with respect to the head of the mounting bolt, and an improvement in the mounting efficiency of the protector cap.

SUMMARY OF THE INVENTION

There is provided, according to the present invention, in an automotive vehicle having a vehicular body member;
   a bolt engaged with the vehicular body member, said bolt having a head;
   a cap arranged to cover the bolt head and
   a spacer interposed between the bolt and the cap, the spacer serving to position the cap with respect to the bolt head.

DETAILED DESCRIPTION OF THE INVENTION

Figure 1:
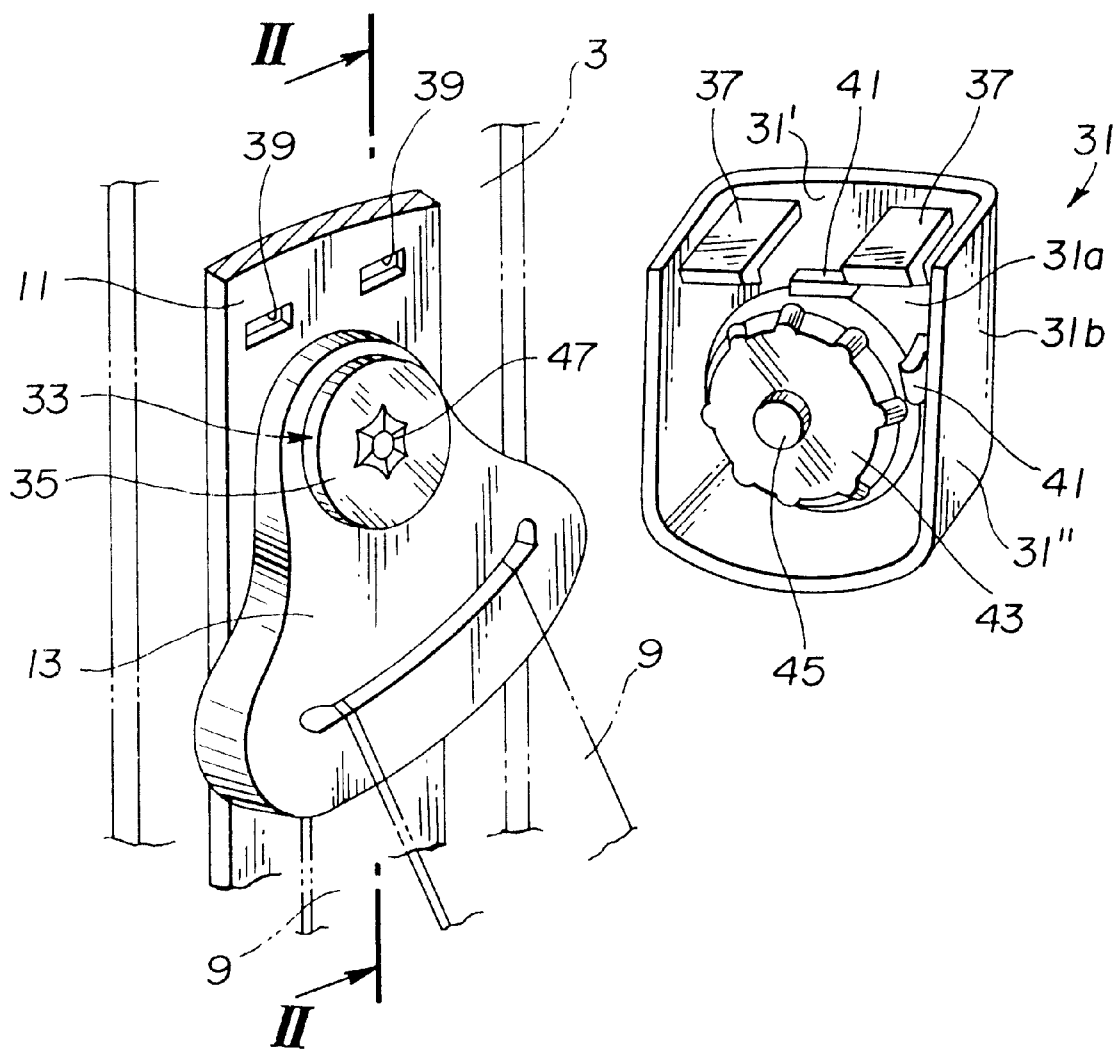
FIG. 1 is a perspective exploded view showing a first preferred embodiment of a protector cap for use in an automotive vehicle according to the present invention.
Figure 2:
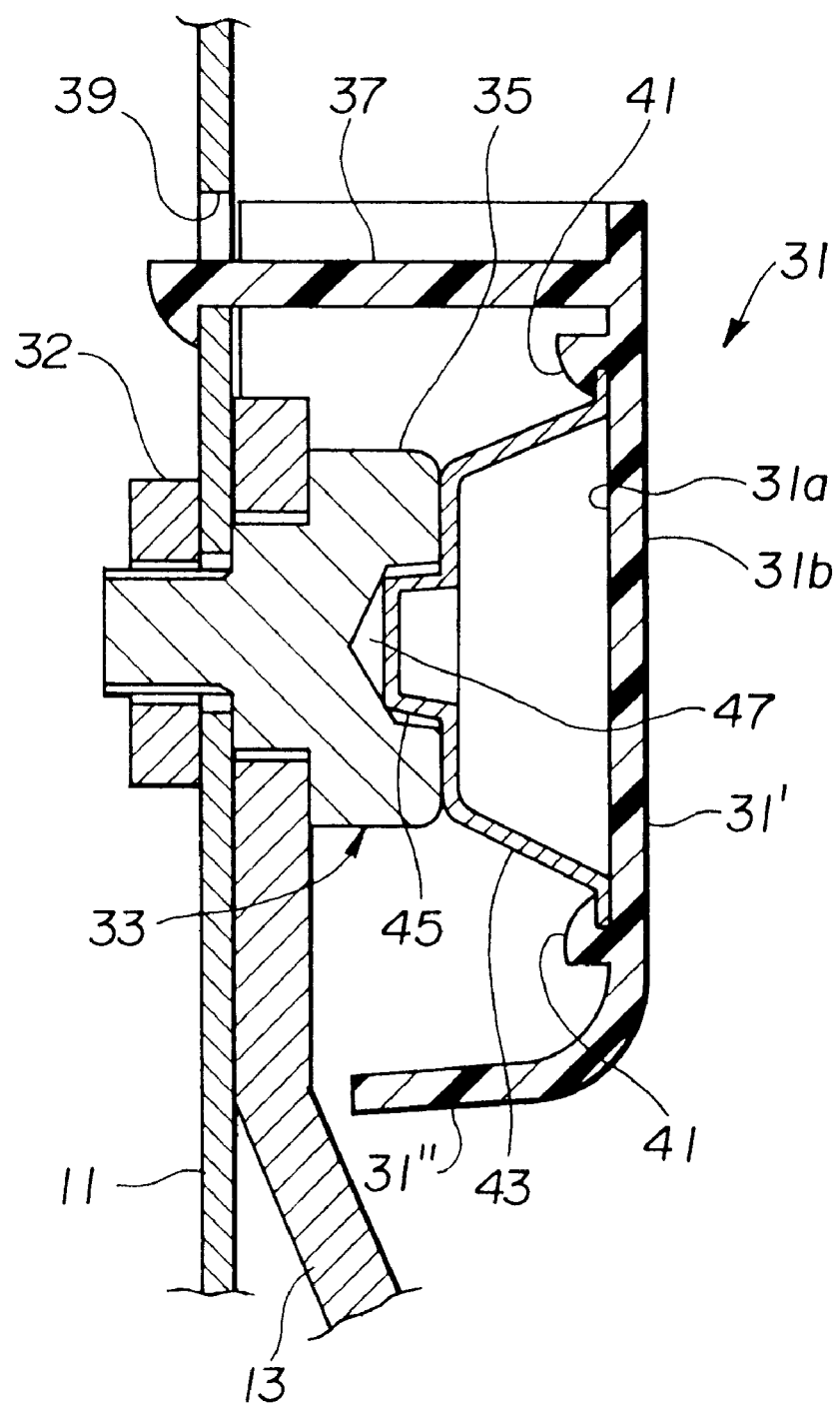
FIG. 2 is a sectional view taken along the line II—II in FIG. 1.

Referring to the drawings, a description will be made with regard to the preferred embodiments of a protector cap for use in an automotive vehicle according to the present invention, FIGS. 1 and 2 show a first embodiment of the present invention. Referring to FIGS. 1 and 2, a protector cap 31 can cover a head 35 of a mounting bolt 33 of metallic material which is engaged with a weld nut 32 fixed on an underside of an adjuster plate 11 as a vehicular body member, which is vertically movably supported with respect to a shoulder adjuster, not shown, supported to a center pillar 3.

The mounting bolt 33 serves to mount an anchor 13 of a seat belt 9 to the adjuster plate 11.

The protector cap 31 has a back wall 31' and a side wall 31", and is formed in a shape to enclose, together with a part of the anchor 13, the head 35 of the mounting bolt 33 on the three sides thereof. The protector cap 31 has an attachment member in the form of claws 37 formed in an upper portion adapted to be engaged with corresponding openings 39 of the adjuster plate 11, and an engaged portion 45 formed in a center of a spacer 43 supported by supports 41 arranged on a back or inside surface 31a of the protector cap 31, the engaged portion 45 being inserted into a tool insertion opening or recess 47 formed in a center of the head 35 of the mounting bolt 33 upon mounting.

Therefore, according to the first embodiment, since the spacer 43, which serves to position the protector cap 31 with respect to the head 35 of the mounting bolt 33, is a different member from the protector cap 31, a sinking is not produced on a an outer surface 31b of the protector cap 31, ensuring a firm mounting of the protector cap 31 with respect to the head 35 of the mounting bolt 33, and an improvement in the mounting efficiency of the protector cap 31.

Moreover, the engaged portion 45 of the spacer 43 is engaged with the tool insertion opening 47 of the head 35 of the mounting bolt 33, ensuring a firmer mounting of the protector cap 31 with respect to the head 35 of the mounting bolt 33. Further, the engaged portion 45 is positionally guided by the tool insertion opening 47, resulting in an improvement in the mounting efficiency of the protector cap 31.

Figure 3:
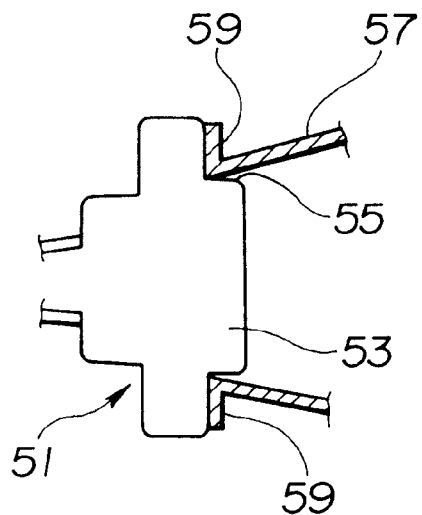
FIG. 3 is a schematic sectional view showing a second preferred embodiment of the present invention.

FIG. 3 shows a second embodiment of the present invention. The second embodiment is substantially the same as the first embodiment except that the spacer has an engaged portion engaged with the periphery of the head of the mounting bolt.

Specifically, formed on the periphery of a head 53 of a mounting bolt 51 is a recess 55 with which a flange or engaged portion 59 of a spacer 57 is engaged.

Figure 4:
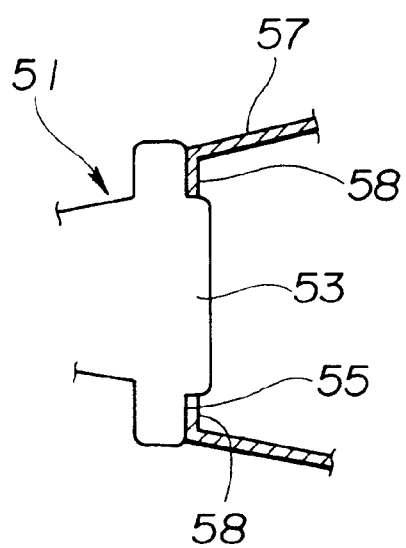
FIG. 4 is a view similar to FIG. 3, showing a variant of t second preferred embodiment.

Therefore, according to the second embodiment, the flange or engaged portion 59 extending outside from the spacer 57 is engaged with the recess 55 formed on the periphery of the head 53 of the mounting bolt 51, ensuring a firmer mounting of the protector cap 31 with respect to the head 53 of the mounting bolt 51, resulting in an improvement in the mounting efficiency of the protector cap 31. Referring to FIG. 4, a flange or engaged portion 58 extending inwardly may be applied in place of the flange or engaged portion extending outwardly.

Figure 5:
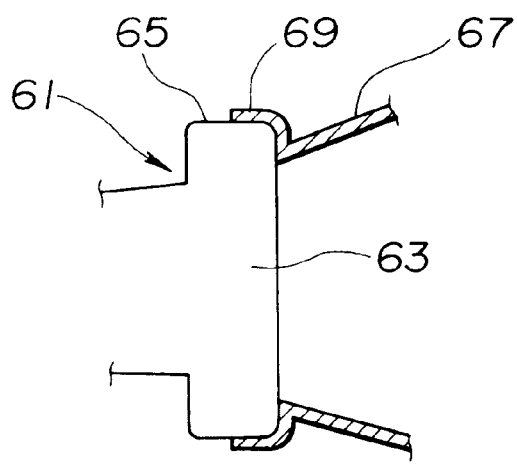
FIG. 5 is a view similar to FIG. 4, showing a third preferred embodiment of the present invention.

FIG. 5 shows a third embodiment of the present invention. The third embodiment is substantially the same as the first embodiment except that the spacer has an engaged portion engaged with the head of the mounting bolt.

Specifically, formed on the periphery of a head 63 of a mounting bolt 61 is a wall 65 with which a flange or engaged portion 69 of a spacer 67 is engaged.

Therefore, according to the third embodiment, the flange or engaged portion 69 of the spacer 67 is engaged with the wall 65 formed on the periphery of the head 63 of the mounting bolt 61, ensuring a firmer mounting of the protector cap 31 with respect to the head 63 of the mounting bolt 61, resulting in an improvement in the mounting efficiency of the protector cap 31.

Figure 6:
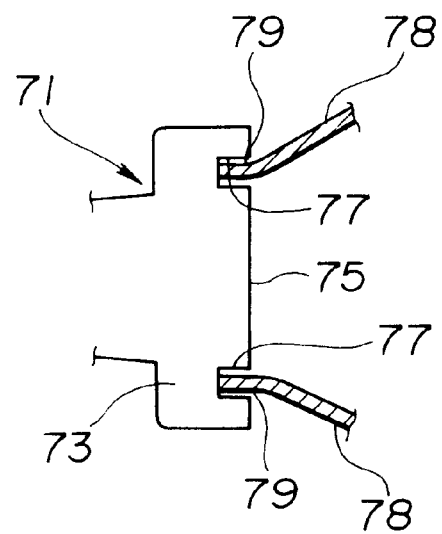
FIG. 6 is a view similar to FIG. 5, showing a fourth preferred embodiment of the present invention.

FIG. 6 shows a fourth embodiment of the present invention. The fourth embodiment is substantially the same as the first embodiment except that the spacer has an engaged portion engaged with the head of the mounting bolt.

Specifically, formed in a flat portion 75 of a head 73 of a mounting bolt 71 is a recess 77 with which a flange or engaged portion 79 of a spacer 78 is engaged.

Therefore, according to the fourth embodiment, the flange or engaged portion 79 of the spacer 78 is engaged with the recess 77 formed in the flat portion 75 of the head 73 of the mounting bolt 71, ensuring a firmer mounting of the protector cap 31 with respect to the head 73 of the mounting bolt 71, resulting in an improvement in the mounting efficiency of the protector cap 31.

Figure 7:
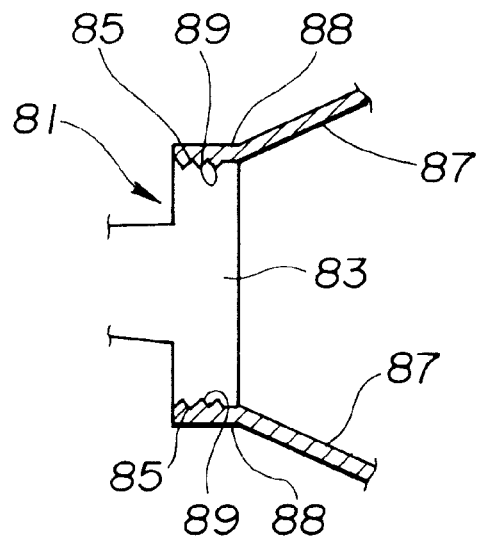
FIG. 7 is a view similar to FIG. 6, showing a fifth preferred embodiment of the present invention.

FIG. 7 shows a fifth embodiment of the present invention. The fifth embodiment is substantially the same as the first embodiment except that the spacer has an engaged portion engaged with the head of the mounting bolt.

Specifically, formed on the periphery of a head 83 of a mounting bolt 81 is an external thread 85 meshed with an internal thread or engaged portion 89 formed at an end 88 of a spacer 87.

Therefore, according to the fifth embodiment, the internal thread or engaged portion 89 formed at the end 88 of the spacer 87 is meshed with the external thread 85 formed on the periphery of the head 83 of the mounting bolt 81, ensuring a firmer mounting of the protector cap 31 with respect to the head 83 of the mounting bolt 81, resulting in an improvement in the mounting efficiency of the protector cap 31.

Figure 8:
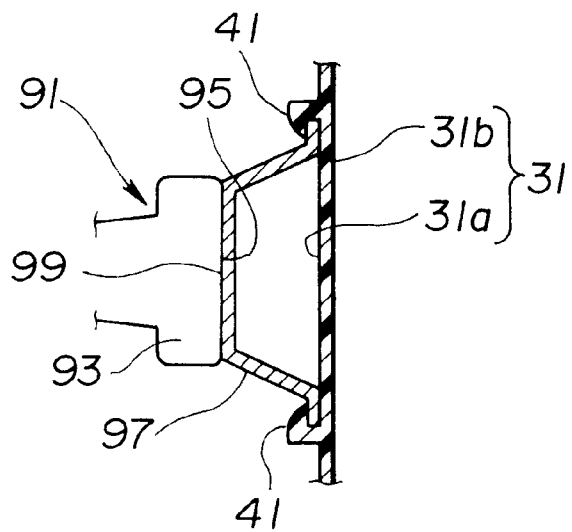
FIG. 8 is a view similar to FIG. 7, showing a sixth preferred embodiment of the present invention.

FIG. 8 shows a sixth embodiment of the present invention. The sixth embodiment is substantially the same as the first embodiment except that the spacer has an engaged portion engaged with the head of the mounting bolt.

Specifically, formed on a head 93 of a mounting bolt 91 is a flat portion 95 on which a bottom or engaged portion 99 of a spacer 97 is abutted.

Therefore, according to the sixth embodiment, the bottom 99 of the spacer 97 is abutted on the flat portion 95 formed on the head 93 of the mounting bolt 91, ensuring a firmer mounting of the protector cap 31 with respect to the head 93 of the mounting bolt 91, resulting in an improvement in the mounting efficiency of the protector cap 31.

Having described the present invention in connection with the preferred embodiments, it is noted that the present invention is not limited thereto, and various changes and modifications can be made without departing from the spirit of the present invention.

What is claimed is:

1. A bolt and cap assembly for use in a vehicle, comprising:

a bolt adapted to be secured to a vehicle body member and having a bolt head;

a cap made of a molded resin and having a generally flat wall for covering the bolt head, the wall having a front surface adapted to face toward an interior of the vehicle and a back surface face toward the bolt head;

an attachment member integrally formed with the cap at the back surface of the wall; and a spacer having one end engaging the bolt and having another end engaging the back wall of the cap using the attachment member so that the spacer securely holds the cap relative to the bolt head, wherein the spacer is generally frusto-conical in shape and comprises an annular wall expanding toward the cap while leaving a substantially hollow cavity for receiving an external impact applied to the cap from within the vehicle interior.

2. A bolt and cap assembly as claimed in claim 1, wherein the expanding annular wall separates the bolt head from the back surface of the cap with a substantial clearance so that the impact will effectively be absorbed.

3. A bolt and cap assembly as claimed in claim 1, wherein the attachment member comprises a plurality of supports arranged on the back surface.

4. A bolt and cap assembly as claimed in claim 3, wherein the spacer has a flange portion engaging the supports.

5. A bolt and cap assembly according to claim 2, wherein the bolt is adapted to engage to a pillar of the vehicle, with the bolt head facing toward the interior of the vehicle.

6. A bolt and cap assembly according to claims 5, further including a claw integrally formed on the back surface of the cap and extending toward the bolt head and adapted to engage a vertically movably supported adjuster plate of the vehicle to which the bolt is adapted to be secured.

* * * * *